United States Patent
Alxneit (10) Patent No.: US 9,581,423 B2
(45) Date of Patent: Feb. 28, 2017

(54) METHOD FOR MEASURING A THREE-DIMENSIONAL OBJECT

(71) Applicant: Spieth-Maschinenelemente GmbH & Co. KG, Esslingen (DE)

(72) Inventor: Heiko Alxneit, Fellbach (DE)

(73) Assignee: SPIETH-MASCHINENELEMENTE GMBH & CO. KG, Esslingen (DE)

( * ) Notice: Subject to any disclaimer, the term of this patent is extended or adjusted under 35 U.S.C. 154(b) by 291 days.

(21) Appl. No.: 13/261,841

(22) PCT Filed: Oct. 2, 2012

(86) PCT No.: PCT/EP2012/004130
§ 371 (c)(1),
(2) Date: Apr. 10, 2014

(87) PCT Pub. No.: WO2013/056788
PCT Pub. Date: Apr. 25, 2013

(65) Prior Publication Data
US 2014/0223751 A1 Aug. 14, 2014

(30) Foreign Application Priority Data

Oct. 19, 2011 (DE) .................. 10 2011 116 339

(51) Int. Cl.
*G01B 5/008* (2006.01)
*G01B 5/20* (2006.01)
*G01B 5/004* (2006.01)
*G01B 5/24* (2006.01)

(52) U.S. Cl.
CPC ............. *G01B 5/008* (2013.01); *G01B 5/004* (2013.01); *G01B 5/20* (2013.01); *G01B 5/24* (2013.01)

(58) Field of Classification Search
CPC .......... G01B 5/20; G01B 5/204; G01B 5/004; G01B 5/008; G01B 5/08
USPC ............................ 33/503, 553, 554; 702/168
See application file for complete search history.

(56) References Cited

U.S. PATENT DOCUMENTS 5,251,154 A * 10/1993 Matsumoto et al. .. G01B 7/284
33/199 R
6,460,261 B1 * 10/2002 Noda et al. ............ G01B 5/241
33/199 R
2003/0217592 A1  11/2003 Nagaike et al.
(Continued)

FOREIGN PATENT DOCUMENTS

EP         1450224 A1 *  8/2004 ........... G05B 19/404
EP       1 103 781 B1    8/2005
(Continued)

*Primary Examiner* — R. A. Smith
(74) *Attorney, Agent, or Firm* — Wenderoth, Lind & Ponack, L.L.P.

(57) ABSTRACT

A method for measuring a three-dimension object (10, 10a, 10a', 10h), includes the stationary fixing of the object to a holder (12) rotatable about an axis of rotation (R). At least one surface (22, 22', 24, 26, 26a', 28, 28a) of the object is scanned by a probe (20). The object is rotated about the axis of rotation, and the holder and the probe are moved relative to one another. The holder and the probe are moved linearly relative to one another along a translation axis (T) enclosing an acute angle, with the axis of rotation of the holder and spans a plane within which the probe can be moved.

14 Claims, 10 Drawing Sheets

(56) References Cited

U.S. PATENT DOCUMENTS

| | | | |
|---|---|---|---|
| 2005/0235507 A1* | 10/2005 | Badami et al. | G01B 21/045 33/507 |
| 2009/0055118 A1 | 2/2009 | McLean et al. | |
| 2010/0217561 A1 | 8/2010 | Mills | |

FOREIGN PATENT DOCUMENTS

| | | | | |
|---|---|---|---|---|
| JP | 2005 172810 A | | 6/2005 | |
| JP | 2005172739 A | * | 6/2005 | G01B 5/20 |
| WO | WO 2009114203 A1 | * | 9/2009 | B23F 23/10 |

* cited by examiner

METHOD FOR MEASURING A THREE-DIMENSIONAL OBJECT

FIELD OF THE INVENTION

The invention relates to a method for measuring a three-dimensional object, comprising the stationary fixation of the object to a holder. The holder can be rotated around an axis of rotation. At least one surface of the object is scanned by a sensing device. The object is rotated around the axis of rotation, the holder and the sensing device are moved relative to one another, and the position of the sensing device is detected.

BACKGROUND OF THE INVENTION

EP 1 103 781 B1 discloses a method for measuring a V-groove shape of an object to be measured by fixing the object to a rotary table and using a scanning sensor to measure the position, while the object is rotated on the rotary table. With the known method, an outer surface, in particular an external thread, on the object can be measured. A control is used to scan a double flank contact in such a way that the measuring element comes into contact with two flanks to form the V-groove.

In the manufacture of machine elements, which are typically manufactured as turned parts and which each may have a thread, measuring geometric parameters, in particular thread parameters, of a manufactured machine element according to the selected tolerance class or manufacturing tolerance is necessary. Likewise desirable is measuring the planarity of end faces, since the axial run-out cannot be measured using conventional test methods used in multi-part manufacturing. A measurement of the axial run-out that is easy to carry out allowing determining the respective manufacturing tolerance to be implemented, even when manufacturing a plurality of machine elements, and consequently ensures a high degree of manufacturing quality. Sometimes the measurement of the axial run-out represents a competitive advantage.

SUMMARY OF THE INVENTION

An object of the invention is to provide an improved method that can be carried out simply and that can be implemented in the manufacture of a plurality of objects, such as machine elements. This method permits determining the geometric parameters, in particular of an axial run-out, on the respective object.

This object is basically achieved by a method where the holder and the sensing device are moved linearly relative to one another along a translation axis. The translation axis forms an acute angle with the axis of rotation of the holder and defines a plane within which the sensing device can be moved.

The arrangement, according to the invention, of the axis of rotation and of the translation or movement axis, respectively, in a plane results in a projection in this plane. In other words, the coordinates that are to be measured are reduced from 3 dimensions to 2. Thus the use of a costly tool for three-dimensional detection that sometimes requires a long measurement cycle is rendered unnecessary. The reduction to two dimensions to be detected permits using simple and inexpensive tools for the detection of the position of the sensing device in the two-dimensional plane defined by the axis of rotation and the translation axis, and makes shortened measurement cycles possible.

The detection of the position of the sensing device is advantageously carried out in a coordinate system. The translation axis runs parallel to a coordinate axis of the coordinate system, typically of a Cartesian coordinate system having an X axis, a Y axis and a Z axis. According to the invention, a projection occurs, for example according to Z=0, in the plane defined by the X axis and Y axis. The angle $\phi$ between the axis of rotation of the holder and the X axis and the radial distance from a simple point on the axis of rotation to the origin of the coordinate system represents the respective position in cylindrical coordinates. Based on the angle $\phi$ and the velocity of rotation $\omega$ of the object around the axis of rotation, as well as the speed of the relative movement of the holder and sensing device, the full three-dimensional configuration of the object that is to be measured can be determined or calculated.

Especially advantageously, the angle between the translation axis and the axis of rotation is 15°. For example, the object that is to be measured, such as a lock nut or a ring nut, can be mounted on a plane table at a 15° angle.

In a variant of the method according to the invention, an end face of the object disposed transversely to the axis of rotation is scanned by the sensing device. With a simultaneous rotation of the lock nut and travel movement of the sensing device, the thread of the lock nut and the end face thereof are scanned by the sensing device as part of a contour measurement device. The end face refers to the circular front surface, which is or should be disposed transversely, ideally perpendicular to the axis of rotation of the lock nut. The location of a reference axis, which ideally coincides with the axis of rotation, is determined from the calculation of the geometry of the thread. The contour of the end face is subsequently determined in reference to the reference axis. In particular, the desired information as to whether the end face is disposed such that it is evenly formed and runs perpendicular to the axis of rotation or to the reference axis of the thread, can hereby be obtained.

In a further variant, an inner surface or an outer surface, in particular extending parallel to the axis of rotation, is scanned by the sensing device. In so doing, a thread provided on the inner surface or the outer surface can be scanned. In addition to determining the form of the respective thread or the configuration of the respective surface, the method according to the invention offers a conclusion as to the rotational symmetry thereof with respect to the axis of rotation or the determination of a corresponding reference axis or axis of rotation respectively. Accordingly, the method according to the invention is preferably used for objects, which have a shape that is rotationally symmetrical to the axis of rotation, in particular a cylindrical shape, since according to the invention, a quality control during the manufacture of corresponding objects can be carried out here.

The object that is to be measured is typically a machine element, such as a lock nut or a ring nut, and is preferably manufactured as a turned part. Geometric parameters of the object, such as profile shape, reference axes, total axial run-out, concentricity and total radial run-out of corresponding surfaces can be determined from the positions of the sensing device detected during a specific rotational movement of the holder and a specific translation movement between the holder and sensing device. Of particular interest to users are the profile shape tolerance of a thread, the angle of the front surface or end face to the reference axis or axis of rotation, the planarity of the end face, the perpendicularity of the end face to the reference axis, and the total axial run-out to the reference axis.

The invention further relates to a device for carrying out the method of the invention. The device according to the invention is characterized by a comparatively low design effort. The holder is typically part of a clamping device, by which an inclination can be set that corresponds to the desired angle, and a constant speed of 0-60 revolutions per minute can be selected. The axial and radial run-out precision is less than 0.1 μm of the diameter that is typically 150-200 mm. An additional component is typically a contour measurement device having a constant feed speed ≤0.1 mm per second, and a disk probe, which outputs X, Y coordinates in a Cartesian coordinate system at a resolution of 0.1 μm. An evaluation unit, as a third component of the device, can output the reference axes, bearing flanks, bearing and securing flanks, as well as parameters, in part and in full, after entering feed rate, speed, scatter plot and thread data.

In summary, according to the invention, a method is provided for the direct determination of reference axes and manufacturing tolerances, in particular of thread and of axial run-outs with regards to threads. Both cylindrical geometries according to DIN EN ISO 12180-2 and plane geometry according to DIN EN ISO 12781-2 can be detected using the method according to the invention. With the evaluation logic implemented in the device, deviations in form and position, as well as a corresponding aspect, are determined on the basis of the recorded geometry. The method according to the invention can be carried out with devices or machines respectively, which are highly precise and at the same time inexpensive due to their simple structure. The detection of complex geometries can be combined with the measurement of simple geometries, without additional retooling efforts, so that achieving a high degree of precision at a low cost is possible.

The above-mentioned features and the additional listed features can be implemented according to the invention, either individually or in any combination.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
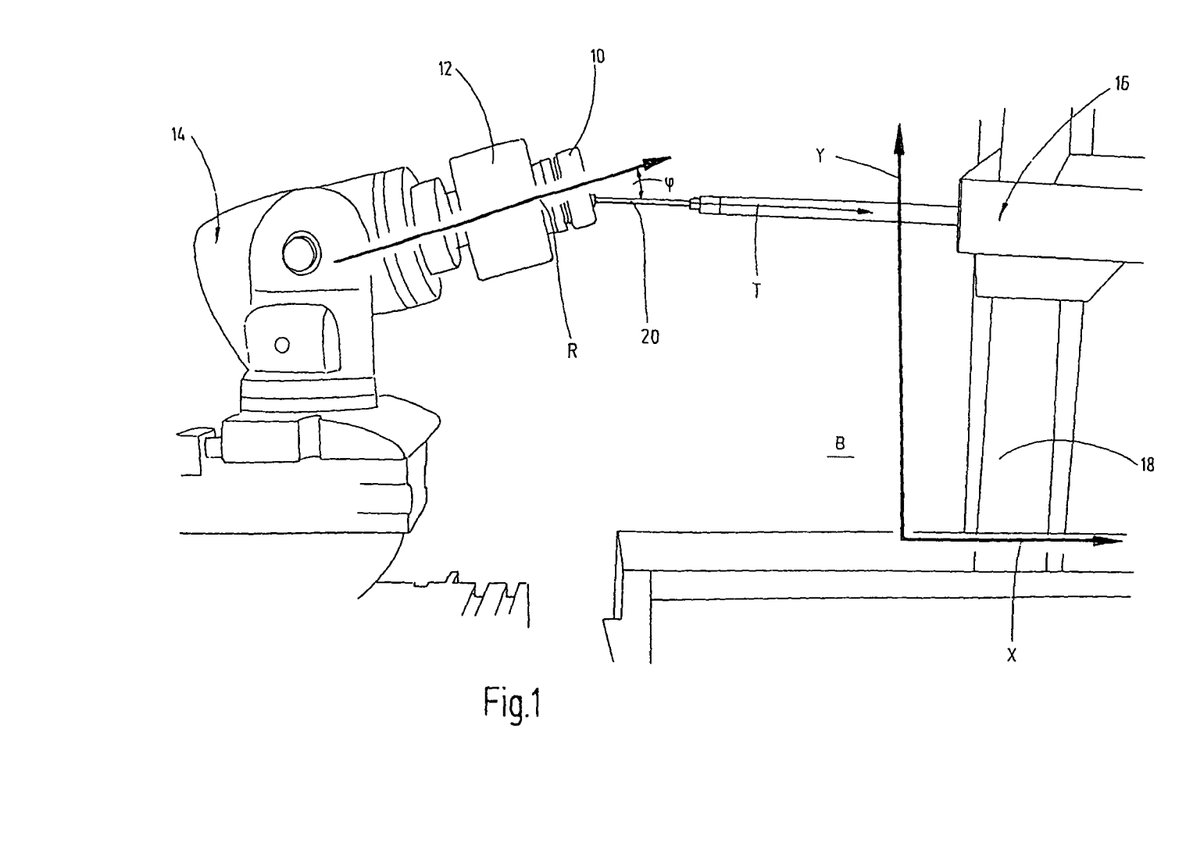
FIG. 1 a side view of a device for carrying out the method according to an exemplary embodiment of the invention.

FIG. 1 shows a side view of a device for measuring a three-dimensional object 10, which is immovably disposed, or in other words fixed, on a spindle-shaped holder 12 of a clamping device 14. Shown on the right hand side of FIG. 1, across from the clamping device 14 with the object 10 fastened to the holder 12, is a contour measurement device 16 having a carriage 18 that can be movably guided in the X direction and a sensing device 20 displaceably disposed thereon. Sensing device 20, in addition, can be displaced in the Y direction extending vertical to the X direction. The sensing device 20 is displaceably disposed in a movement plane B that is defined by the X axis and Y axis, and is in contact with the three-dimensional object 10 that is to be measured.

As clearly seen in FIG. 1, an axis of rotation R of the holder 12 for the object 10 is disposed in the movement plane B defined by X axis and Y axis, and forms an acute angle φ with the X axis. The holder 12 with the object 10 attached thereto is rotated around the axis of rotation R for measurement, and at the same time, the sensing device 20 moves along a translation axis T that extends parallel to the X axis. The position of the sensing device 20 in the movement plane B as a function of time is detected by the contour measurement device 16. The desired geometric parameter, such as the profile shape, of the measured object 10 is determined from the measured trajectory b (X, Y) using an evaluation unit not shown in FIG. 1, taking into account the rotational movement of the holder 12 and the translational movement of the sensing device 20.

Figure 2:
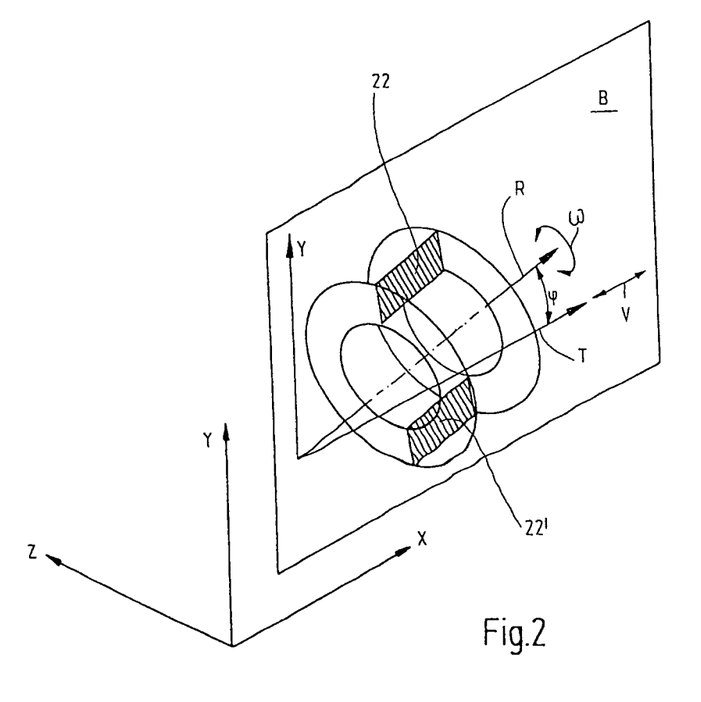
FIG. 2 is a perspective view of an arrangement according to the invention in a coordinate system.

FIG. 2 shows that the arrangement according to the invention of the axis of rotation R and of the translation axis T in the movement plane B defined by the X axis and the Y axis of a Cartesian coordinate system X, Y, Z corresponds to a projection in the plane corresponding to Z=0. A surface 22, 22' that is to be measured on the object is guided through the movement plane B and measured there by the rotation of the object 10 that is to be measured (not shown in FIG. 2) around the axis of rotation R having the angular velocity ω. The rotational movement of the object is indicated by circular lines. FIG. 2 clearly shows that the complete three-dimensional information is acquired through measurement by a translational movement having the speed v along the translation axis T and a rotational movement around the rotational axis or axis of rotation R, both of which lie in the movement plane B.

Figure 3A:
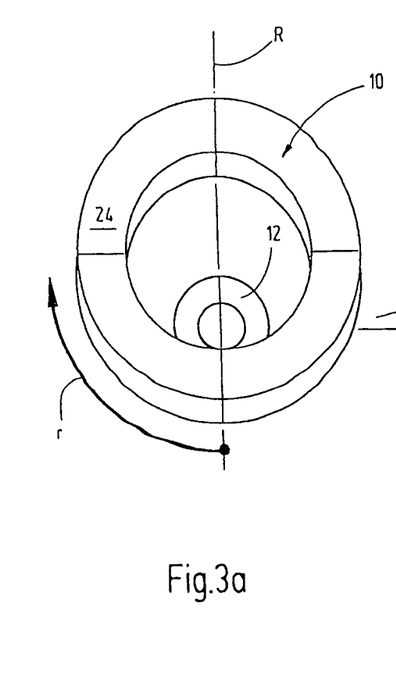
FIG. 3a is a perspective view of a three-dimensional object that is to be measured.
Figure 3B:
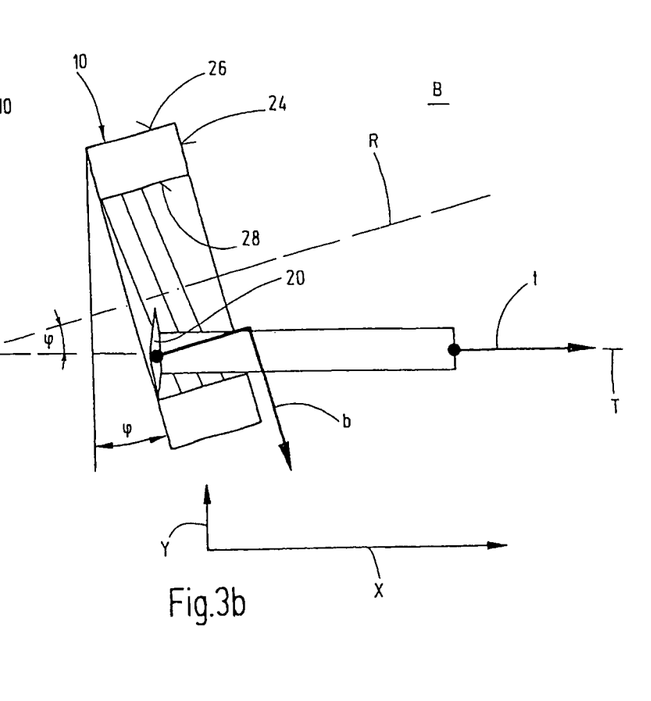
FIG. 3b is a side view in section through the object in FIG. 3a having a sensing device in contact therewith for taking measurements according to the invention.

The perspective view of the three-dimensional object 10 shown in FIG. 3a is shaped as a turned part that is formed such that it is rotationally symmetrical to the axis of rotation R and has a circular end face 24. The rotational movement r of the object 10 together with the holder 12 holding this object stationary is indicated with an arrow. FIG. 3*b* shows a cross section through the object 10 illustrating an outer surface 26 and an inner surface 28, which inner surface has an internal thread, as well as the end face 24. End face 24 extends essentially perpendicular to the axis of rotation R. In the case of a predefined translational movement t of the sensing device 20 that is in contact with the object 10 along the translation axis T, the sensing device 20 performs a scanning movement, illustrated by arrow b, in the movement plane B. A positional curve or trajectory b (X, Y) of the sensing device 20 is recorded in the coordinate system X, Y.

Figure 4:
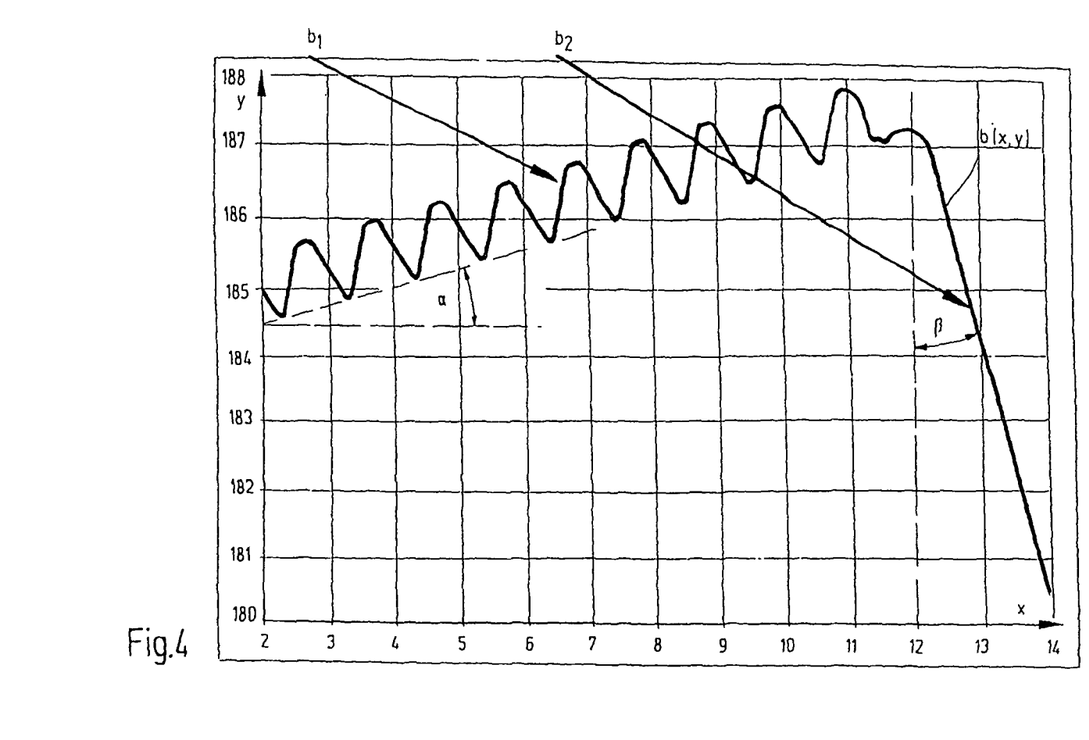
FIG. 4 is a graph of a position or trajectory of the sensing device measured by the arrangement shown in FIG. 3b.

The recorded trajectory b (X, Y) is shown in FIG. 4. In a first rising section b, of the trajectory b (X, Y), the scanned contour of the scanned internal thread can be detected on the inner surface 28. In the second section $b^2$, the trajectory b (X, Y) falls off and does not have a periodic, but rather a straight, course corresponding to the planar form of the end face 24. The first section $b^1$ and the second section $b^2$ each form an angle α, β with the coordinate axes X, Y, respectively. In the case of a desired configuration of the measured object 10, the axis of rotation R and the rotational or reference axis, respectively, of the rotationally symmetrical object 10, coincide. The first angle α then coincides with the angle of inclination ϕ. In the case of a desired vertical orientation of the end face 24 in relation to the axis of rotation R of the internal thread provided on the inner surface 28, the second angle β likewise corresponds to the angle of inclination ϕ. In the example shown, the angle of inclination is ϕ=15°.

Figure 5:
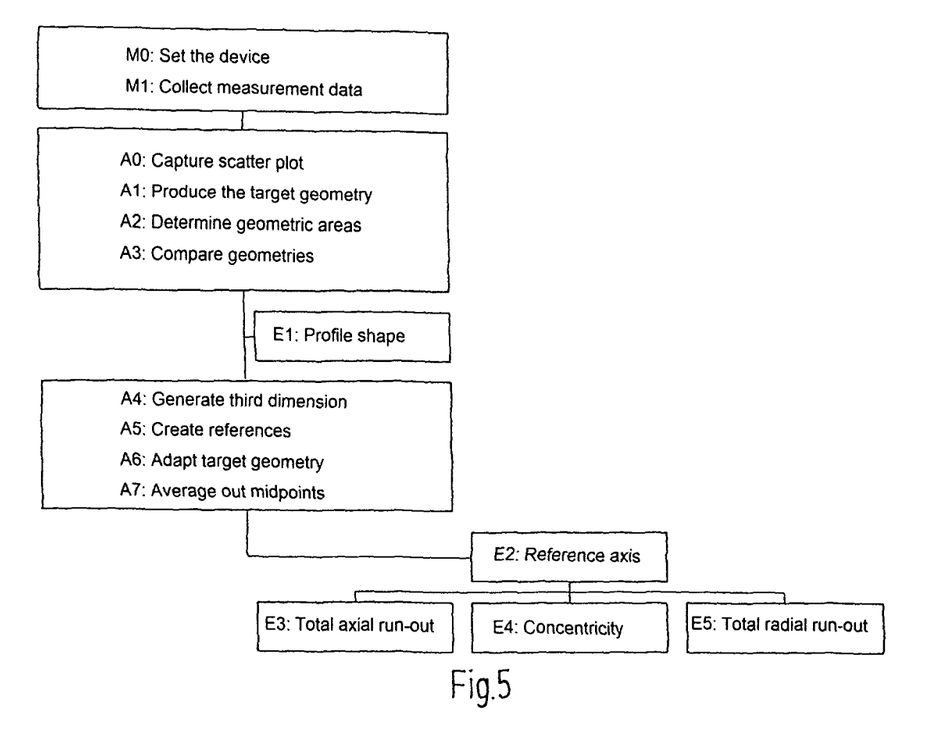
FIG. 5 is a flow diagram of the method according to the invention, including the determination of geometric parameters of the measured three-dimensional object.
Figure 6A:
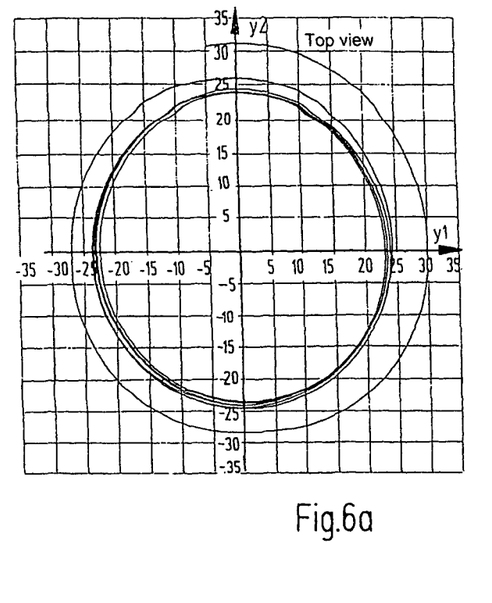
FIGS. 6a and 6b each are graphs showing a measurement data curve illustrating an evaluation step of the method according to the invention.
Figure 6B:
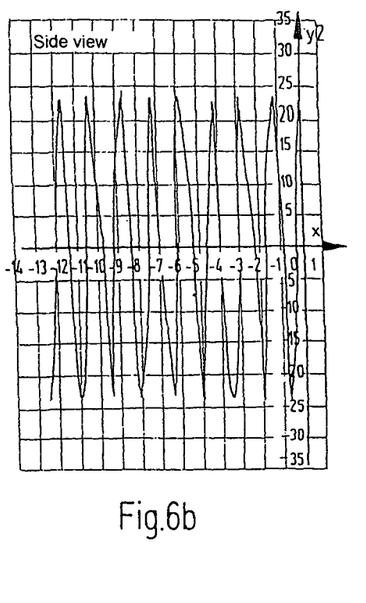

The flowchart in FIG. 5 shows the evaluation steps A0 to A7 according to the measurement steps M0 and M1. By these steps the geometric parameters E1 to E5 of the measured object 10 can be detected. The evaluation step A4 for generating a third dimension is shown in FIGS. 6*a* and 6*b*. FIG. 6*a* shows a top view of the spiral-shaped curve that descends from the sensing device 20 to the end face 24. Corresponding to the side view shown in FIG. 6*b*, an oscillating trajectory is created by the translational movement t of the sensing device 20 in the X direction. Using the ratio of the velocity v of the translational movement t to the velocity of rotation ω of the rotational movement r, the measured V-coordinates can be moved in two axial directions, and thus, 3D information for the entire object 10 can be recalculated from 2D information detected in movement axis B=(X, Y, Z=0).

Figure 7A:
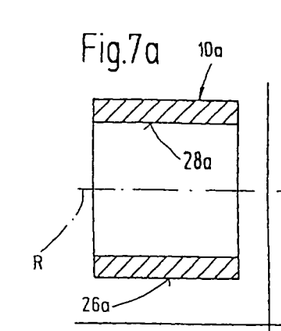
FIGS. 7a-7g are side views in section each showing a three-dimensional object having an inner geometry that is to be measured according to the invention.
Figure 7B:
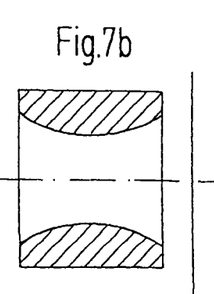
Figures 7C, 7D, 7G, 7H:
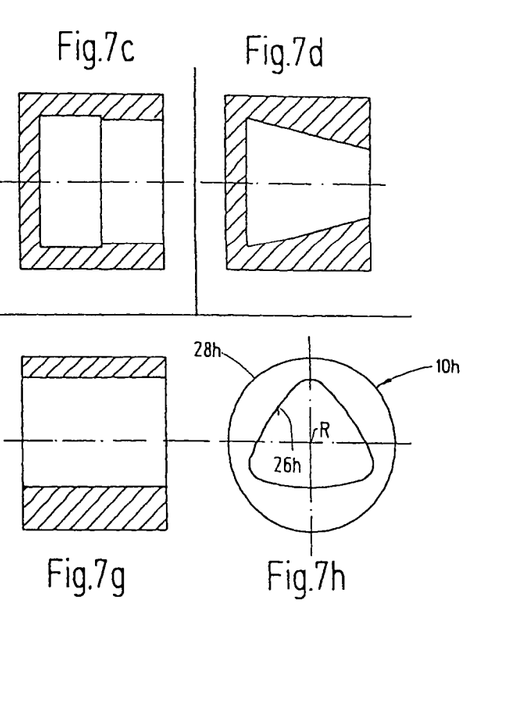
FIG. 7h is an end view of an object having an inner geometry to be measured according to the invention.
Figure 7E:
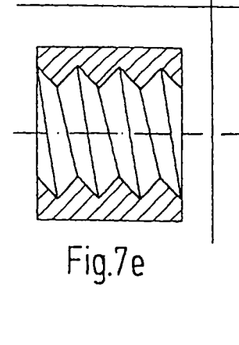
Figure 7F:
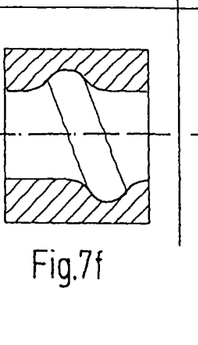
Figure 8A:
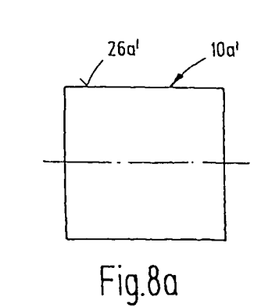
FIGS. 8a-8g are side views each showing a three-dimensional object having an outer geometry that is to be measured according to the invention.
Figure 8B:
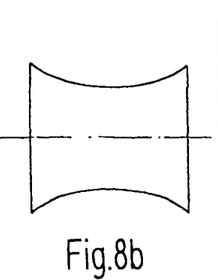
Figure 8C:
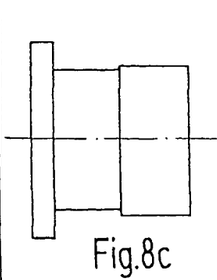
Figure 8D:
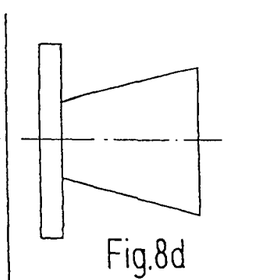
Figure 8E:
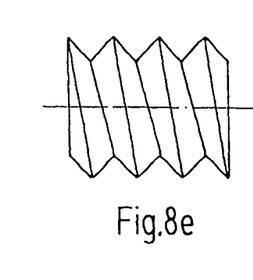
Figure 8F:
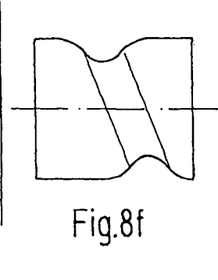
Figure 8G:
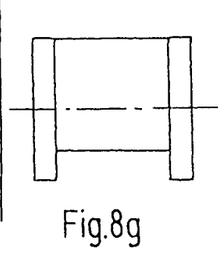
Figure 8H:
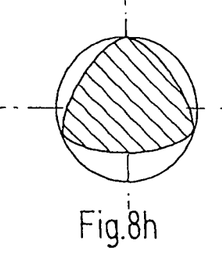
FIG. 8h is an end view in section having an outer geometry to be measured according to the invention.
Figure 9A:
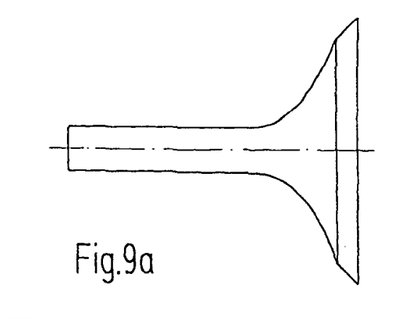
FIGS. 9a-9d are a side view and side views in section, respectively, each showing an additional embodiment of a three-dimensional object that is to be measured according to the invention.
Figure 9B:
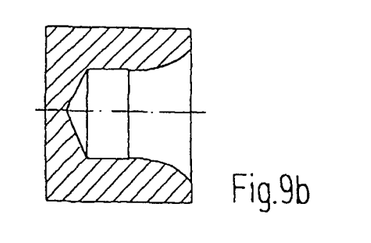
Figure 9C:
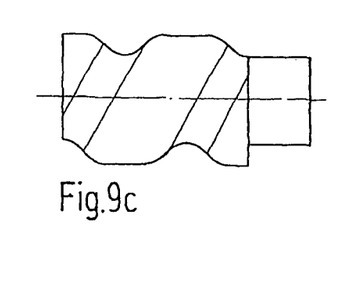
Figure 9D:
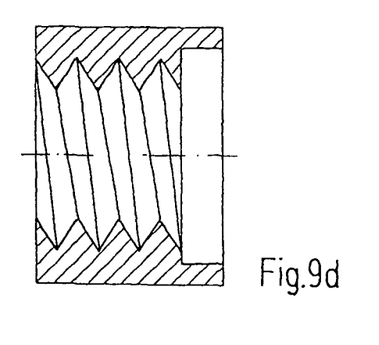

FIGS. 7*a* to 7*g* each show an object 10*a*, which is rotationally symmetrical about an axis of rotation R having an outer surface 26*a* and an individually designed inner surface 28*a* (reference figures only shown in FIG. 7*a*). The respective inner surface 28*a* can be formed by sections such that it is planar, concave, convex, conical, tapered, stepped, provided with a thread, and/or following an arc-shaped course. In the case of the object 10*h* shown in FIG. 7*h*, the outer surface 28*h* is formed such that it is rotationally symmetrical and the inner surface 26*h* is formed having different spacings to the axis of rotation R. The respective counterparts to the specific inner geometries shown in FIG. 7*a*-7*h* are shown in FIG. 8*a*-8*h*, or in other words the object 10*a* shown in FIG. 7*a* and the object 10*a*' shown in FIG. 8*a*, having the outer surface 26*a*', form a solid cylinder in the synopsis, corresponding to FIGS. 7*b* and 8*b*, etc.

FIG. 9*a*-9*d* show additional embodiments with rotationally symmetrical objects having differently designed outer and inner geometries.

Figure 10A:
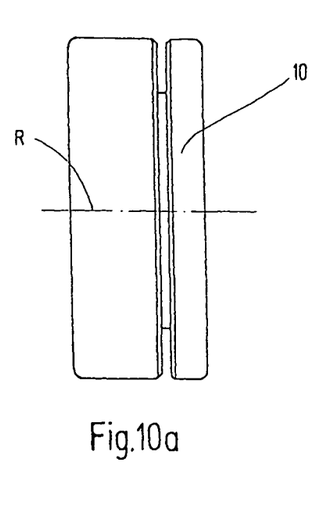
FIGS. 10a-10c are a side view, an end view and a side view in section, respectively, of a threaded lock nut as an object that is to be measured.
Figure 10B:
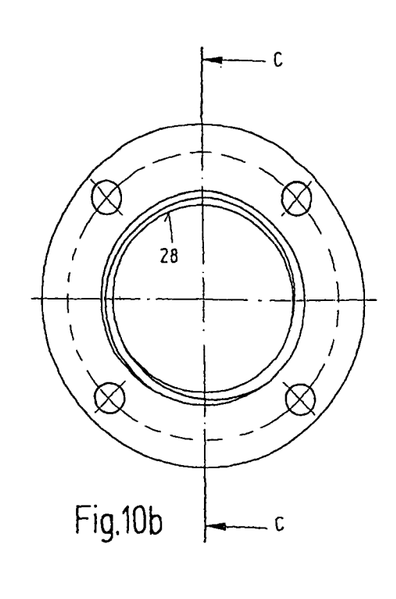
Figure 10C:
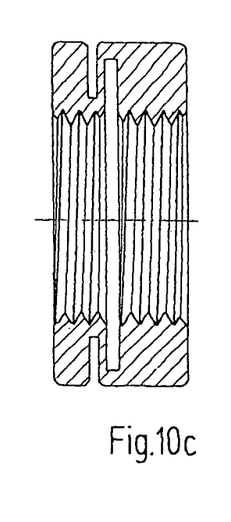

FIG. 10*a*-10*c* illustrate a threaded lock nut, which is shown as a side view in FIG. 10*a*, as a top view in FIG. 10*b* and as a cross sectional view in FIG. 10*c*. The lock nut can be measured by the method according to the invention. The threaded lock nut is designed in such a way that it is rotationally symmetrical to the axis of rotation R and has an internal thread on its inner surface 28 as well as a two-stage recess along the extension thereof along the axis of rotation R, whereby an absence of play is achieved then the threaded lock nut that is shown is used.

While one embodiment has been chosen to illustrate the invention, it will be understood by those skilled in the art that various changes and modifications can be made therein without departing from the scope of the invention as defined in the claims.

The invention claimed is:

1. A method for measuring a three-dimensional object, comprising the steps of:
   stationarily fixing an object to a holder rotatable about an axis of rotation;
   rotating the holder with the objected fixed thereon about the axis of rotation;
   scanning an end face of the object disposed transversely to the axis of rotation with a sensing device, while the object is rotated about the axis of rotation;
   moving the sensor device relative to the holder linearly along a translation axis forming an acute angle with the axis of rotation and defining a plane within which the sensing device is moved;
   detecting positions of the sensor device; and
   determining a location of a reference axis of the object and then subsequently determining a contour of the end face in reference to an axial run-out of the object relative to the reference axis based on detected positions of the sensing device.

2. A method according to claim 1 wherein the positions of the sensing device are detected in an X-Y coordinate system, with the translation axis extending parallel to an X coordinate of the coordinate system.

3. A method according to claim 1 wherein the acute angle between the translation axis and the axis of rotation is equal to 15 degrees.

4. A method according to claim 1 wherein at least one of an inner surface or an outer surface of object is scanned by the sensing device.

5. A method according to claim 4 wherein the at least one of the inner surface and the outer surface extends parallel to the axis of rotation.

6. A method according to claim 5 wherein a thread on the at least one of the inner surface or outer surface is scanned by the sensing device.

7. A method according to claim 1 wherein the object has a shape rotationally symmetrical to the axis of rotation.

8. A method according to claim 7 wherein the object has a cylindrical shape.

9. A method according to claim 1 wherein the object is a machine element.

10. A method according to claim 9 wherein the machine element is a lock nut.

11. A method according to claim 9 wherein the machine element is a ring nut.

12. A method according to claim 9 wherein the machine element is a turned part.

13. A method according to claim 1 wherein geometric parameters of the object are determined from positions of the sensing device detected during a specific rotational movement of the holder and a specific translational movement between the holder and sensing device.

14. A method according to claim 13 wherein the geometric parameters comprise at least one of a profile shape, reference axes, total axial run-out, concentricity or total radial run-out.

* * * * *